United States Patent
McLaughlin

(10) Patent No.: US 7,136,636 B1
(45) Date of Patent: Nov. 14, 2006

(54) SYSTEM AND METHOD FOR USE OF LOCATION TO MONITOR WIRELESS NETWORK CONDITIONS

(75) Inventor: Daniel McLaughlin, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 453 days.

(21) Appl. No.: 10/144,544

(22) Filed: May 13, 2002

(51) Int. Cl.
*H04Q 7/20* (2006.01)
*H04M 1/24* (2006.01)
*H04M 15/00* (2006.01)

(52) U.S. Cl. .................. 455/423; 455/424; 455/405; 379/32.01; 379/112.01; 379/126; 379/133

(58) Field of Classification Search ........ 455/423–425, 455/405–408; 379/32.01, 32.05, 112.01, 379/114.01, 126, 127.01, 133–134
See application file for complete search history.

(56) References Cited

U.S. PATENT DOCUMENTS 5,999,604 A * 12/1999 Walter ................... 379/133

6,298,233 B1 10/2001 Souissi et al.
2002/0119766 A1* 8/2002 Bianconi et al. ............ 455/406

OTHER PUBLICATIONS

"Empower Geographies | One Call", www.empowergeo.com/pages/onecall.htm, printed Oct. 15, 2001, 2 pages.
Alan Gordon, "Network Management: Creating a Virtual Presence", CED Magazine, www.cedmagazine.com/ced/9707/9707b.htm, Jul. 1997, printed Oct. 15, 2001, 7 pages.

* cited by examiner

*Primary Examiner*—George Eng
*Assistant Examiner*—Michael Thier

(57) ABSTRACT

A system and method for using location data to monitor wireless network events are described. One exemplary method includes establishing a plurality of location history records for mobile terminals, establishing a plurality of network operation records for the plurality of mobile stations, and combining the location history records with the network operation records to determine locations of predetermined network events, such as a dropped call event or a blocked call event, in the wireless network.

11 Claims, 4 Drawing Sheets

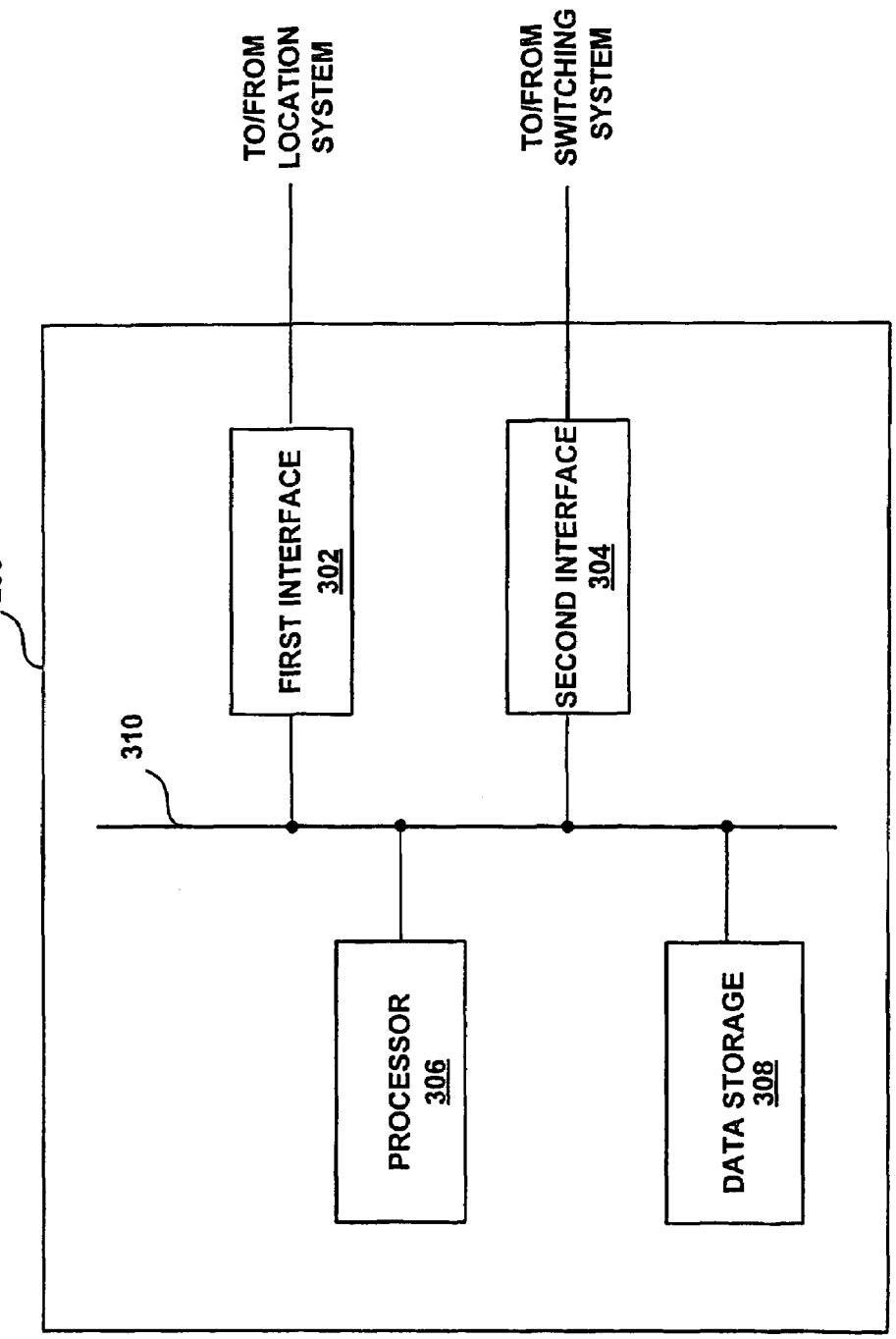

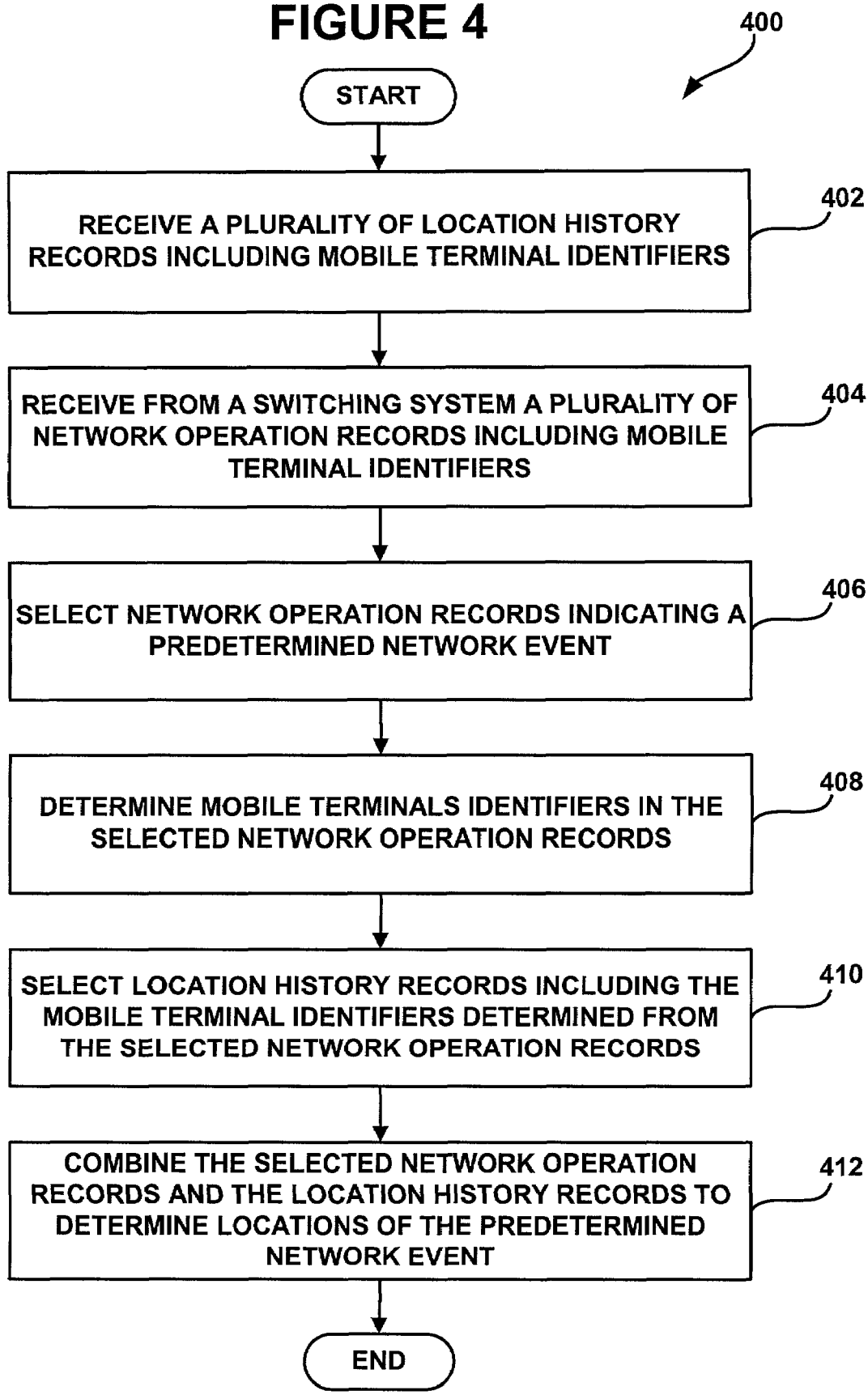

SYSTEM AND METHOD FOR USE OF LOCATION TO MONITOR WIRELESS NETWORK CONDITIONS

BACKGROUND

1. Field of the Invention

The present invention relates to telecommunications systems and, more particularly, to a method and system for using location data to monitor wireless network events.

2. Description of Related Art

In a cellular radio communication system (wireless communications network), an area is divided geographically into a number of cell sites, each defined by a radio frequency ("RF") radiation pattern from a respective base transceiver station ("BTS") antenna. The BTS antennas in the cells are in turn coupled to a base station controller ("BSC"), which is then coupled to a telecommunications switch or a gateway, thereby facilitating communication with a telecommunications network such as the public switched telephone network ("PSTN") or the Internet.

When a mobile terminal, such as a cellular telephone, a pager, or a portable computer, for instance, is positioned in a cell, the mobile terminal communicates via an RF interface with the BTS antenna of the cell. Consequently, a communication path is established between the mobile terminal and the telecommunications network, via the air interface, the BTS, and the gateway.

With the explosive growth in demand for wireless communications, network resources can be stressed. For instance, as the level of call traffic increases, the likelihood of interference between mobile terminals can increase substantially. In response to such an increase in call traffic, the base station of the cell may instruct all mobile terminals in the cell to decrease their transmission power, and the base station may itself begin to communicate at a lower power level with each mobile terminal. With lower transmission power, however, call quality can diminish, and calls may be lost.

Further, as cities and landscapes evolve, changes to topography can substantially effect the operation of a wireless network. For instance, as buildings and trees rise or fall in or around a predetermined area, the location patterns in the area may change drastically. As a result of new or changed signal reflections, for instance, the signal-to-noise ratio may become unacceptably low, and calls may be dropped.

To help manage the call traffic in congested or evolving areas and in other circumstances, a service provider may make changes to the network, such as by repositioning cell sites, subdividing cell sites into a number of sectors, adding new cell sites, or reallocating frequencies among various coverage areas. However, in order to effectively decide when and where such changes should be made, and to provide subscribers with acceptable and expected quality of service, a need still exists for a system and method for monitoring wireless network events.

SUMMARY

The present invention relates to a method and system for using location data to monitor wireless network events.

In accordance with one exemplary embodiment, a wireless carrier may maintain a location history log keyed to mobile terminals as well as a network operation log also keyed to mobile terminals. The carrier may then combine the two logs so as to determine locations where particular network events have occurred. With knowledge of those locations, the carrier can better make decisions about changes or modifications to make in the wireless network.

These as well as other aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 3 is a simplified block diagram of a network monitoring entity suitable for use within the exemplary embodiments; and FIG. 4 is a flow chart depicting a set of functions that may be carried out in accordance with the exemplary embodiments.

DETAILED DESCRIPTION OF EXEMPLARY EMBODIMENTS

Figure 1:
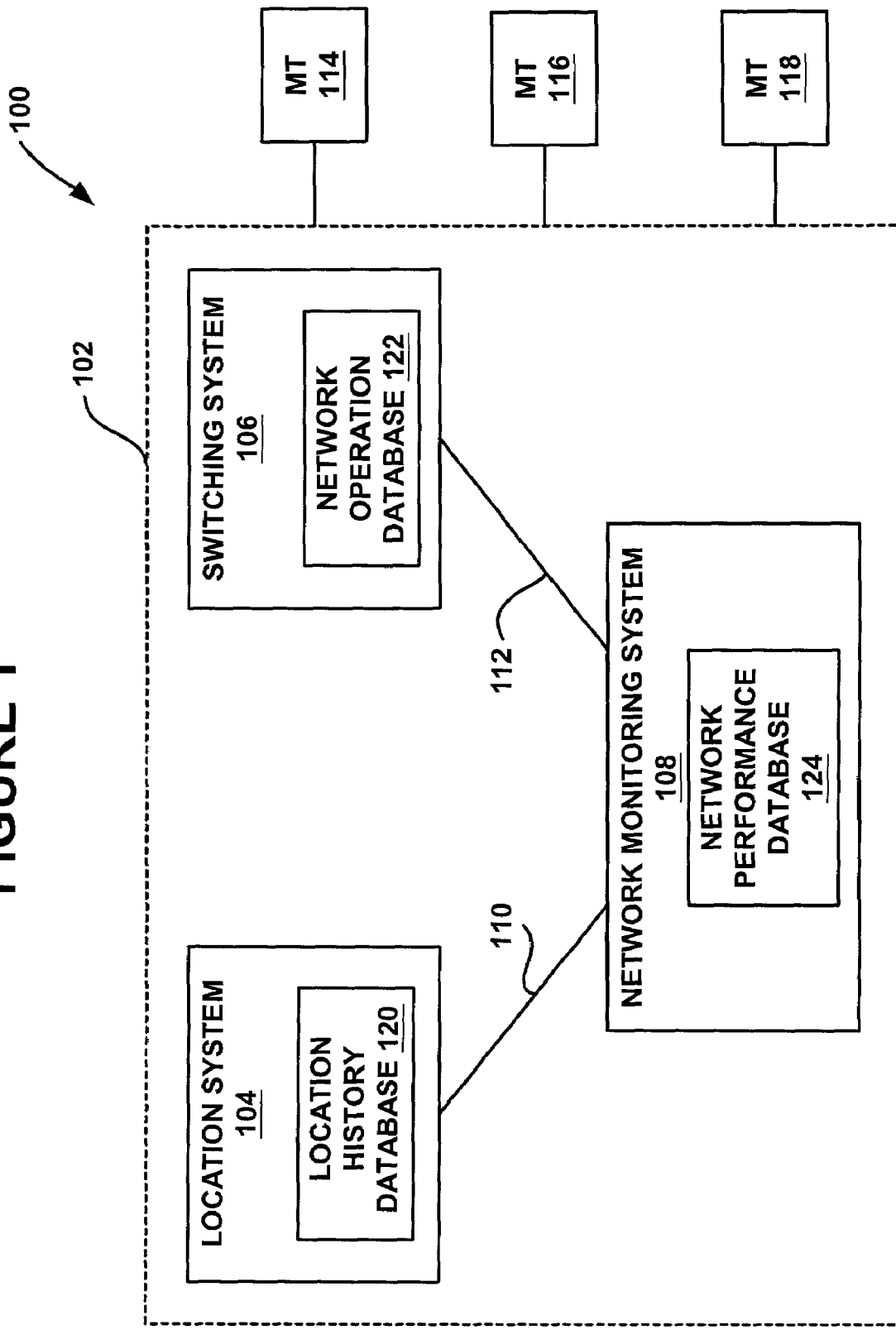
FIG. 1 is a simplified block diagram illustrating a system arranged in accordance with the exemplary embodiments.

FIG. 1 illustrates a simplified block diagram of a telecommunications system 100 in which exemplary embodiments for using location data to monitor wireless network events can be employed. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination or location.

As shown in FIG. 1, the telecommunications system 100 includes a carrier system 102, which functions to interconnect endpoints so as to establish communication sessions. The carrier system 102 is shown coupled with a number of mobile terminals 114, 116 and 118. The mobile terminals may take any suitable form, such as, for instance, a cellular or PCS telephone, a computer, a fax machine, or a personal digital assistant ("PDA"). As an example, the mobile terminals may be code division multiple access ("CDMA") telephones supporting the IS-2000, or time division multiple access ("TDMA") telephones supporting the IS-136, IS-54 and/or GSM Intersystem Operation Standards ("IOS"), for instance. It should be understood that the mobile terminals could also support any existing or later developed standards.

The carrier system 102 includes a location system 104, a switching system 106 and a network monitoring system 108. The network monitoring system 108 is communicatively linked with the location system 104 and the switching system 106 via communication links 110 and 112, respectively.

The location system 104 functions to determine or obtain location of mobile terminals, such as the mobile terminals 114, 116 and 118. The location is preferably a geographic position, such as latitude/longitude coordinates. However, the location may, alternatively, take other forms. For example, the location could be a street address and/or the name of an establishment in which the originating terminal is positioned.

According to an exemplary embodiment, the location system 104 creates a location history log for the mobile terminals in the network 100 and stores the location history log in a location history database 120. The location history log is established by regularly determining locations of the mobile terminals operating in the system 100, and creating location history records keyed to mobile terminal identifiers, for instance.

The location system 104 may employ any of a variety of position-determining technologies to determine the locations of the mobile terminals over time. In one embodiment, the position-determining technologies may be handset-based (e.g., GPS) or network based (e.g., triangularization), both well known in the art. Alternatively, to conserve network resources, the location system 104 can track locations of a sample (i.e., a subset) of all mobile terminals operating in the network. By reference to the location log, it is possible to determine where a mobile terminal was located at any given time.

The switching system 106 establishes communication sessions between the terminals in the network 100. According to an exemplary embodiment, the switching system 106 creates a network operation log for the mobile terminals in the network 100, and stores the network operation log in a network operation database 122.

The network operation log may reflect operation of the network over time with respect to mobile terminals. The network operation log includes a number of network operation records keyed to mobile terminals identified with a mobile identification number ("MIN") or a different identifier. For instance, with respect to a given mobile terminal, the network operation log may reflect the times when the mobile terminal was engaged in a call, and the times when predetermined network events occurred with respect to the mobile terminal in the network 100. According to an exemplary embodiment, the predetermined network events may relate to predetermined call events that occurred with respect to the mobile terminals in the network 100, and the call events, as will be described in greater detail below in reference to the subsequent figures, may include a dropped call event or a blocked call event, for instance. However, it should be understood that the present invention is not limited to such network operation events, and different network events could also be included in the network operation log stored in the network operation database 122.

The network monitoring system 108 may access and combine the location history log and the network operation log together so as to determine locations where predetermined network events have occurred. By combining the two logs together and generating a combined log, the network monitoring system 108 can determine, at any given time, a network event, and the location of the mobile terminal involved with the network event. The network monitoring system 108 may then store the collected data in a network performance database 124 that may be accessed by any network entity in the carrier system 102 so as to generate useful information about the network. Alternatively, as will be described in greater detail below, the network monitoring system 108 may use the collected data to generate one or more network performance reports including, for instance, times and locations of the predetermined network events in the wireless network.

Alternatively, instead of combining the two logs, the network monitoring system 108 may query the network operation database 122 to determine if the network operation log includes any records with the predetermined network events. If any such records exist on the network operation database 122, the switching system 106 may send to the network monitoring entity 108 only those records that include the specified network events. Responsive to receiving the records, the network monitoring system 108 may determine the mobile terminals specified in the received records. Once the mobile terminals are identified, the network monitoring system 108 may query the location history database 120 to provide location history records of the respective mobile terminals. Then, the network monitoring system 108 may combine the received records and store them in the network performance database 124.

Figure 2:
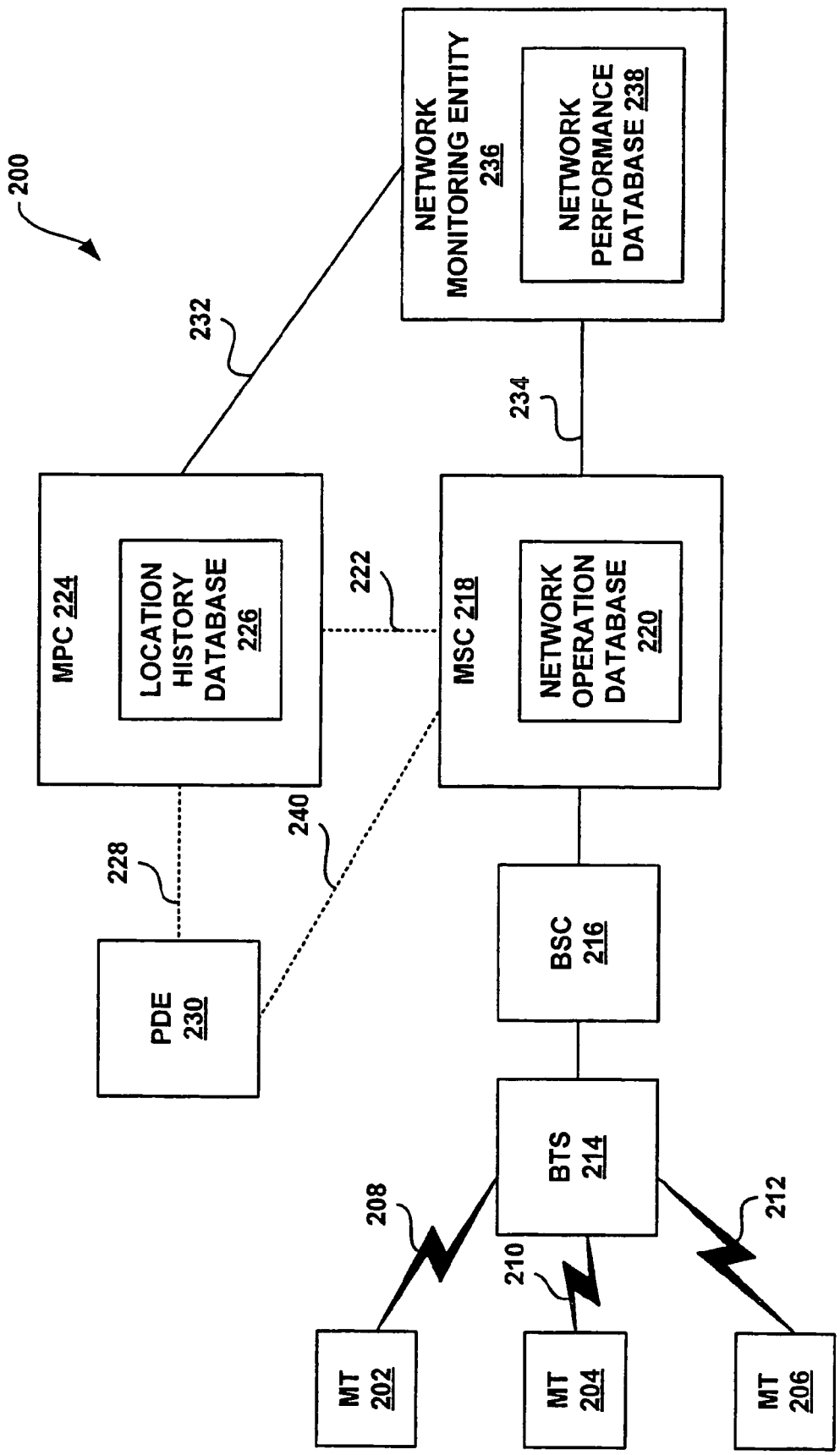
FIG. 2 is a simplified block diagram illustrating a telecommunications network employing the exemplary embodiments.

Referring now to FIG. 2, a simplified block diagram is provided to illustrate operation of the exemplary embodiment for using location data to determine network events in a wireless network 200. The wireless network 200 includes a Mobile Switching Center ("MSC") coupled with one or more base station controllers ("BSC") 216. Each BSC is in turn coupled with one or more base transceiver station ("BTS") 214, and each BTS includes one or more antenna elements arranged to produce a radiation pattern defining a cell and respective sectors. One or more mobile terminals 202, 204 and 206 may then operate within a given cell and sector, and each mobile terminal may communicate via respective air interfaces 208, 210 and 212 with the BTS 214, and in turn via the BSC 216 with the MSC 218. The MSC 218 may then connect calls between any given mobile terminal and other entities.

As further illustrated by way of example, the MSC 218 is coupled by a signaling link 222 to a mobile positioning center ("MPC") 224. The MPC 224 is then coupled by a signaling link 228 to position determination equipment ("PDE") 230 that is in turn coupled by a signaling link 240 to the MSC 218. As defined by J-STD-036, the MPC functions to retrieve, forward, store and control position data, and the PDE functions to determine precise position or geographic location of mobile stations. Further, both the MPC 224 and the PDE 230 may be programmed with industry standard message sets such as those defined by TIA/EIA/IS-41D, TIA/EIA/IS-801, and J-STD-036, so as to facilitate communication over signaling links 222, 228 and 240.

Further, it should be understood that the MSC 218, the MPC 224 and/or the PDE 230 may be combined into a single entity. Alternatively, MPC 224 may be implemented as one or more computer applications and database functions on a Service Control Point ("SCP") such as the Integrated Service Control Point ("ISCP") made by Telcordia Technologies, Inc. Further, another SCP may be positioned along the signaling link 222, so that the MSC 218 may communicate with the other SCP, and the other SCP may in turn communicate with the MPC 224.

In the exemplary embodiment illustrated in FIG. 2, the MPC 224 may further communicate with a network monitoring entity 236 via a communication link 232. Additionally, the network monitoring entity 236 may communicate with the MSC 218 via a communication link 234.

The MSC 218 may include a network operation database 220 that stores network operation records reflecting operation of the network 200 over time with respect to the mobile terminals. According to one exemplary embodiment, the network operation records may include call detail records ("CDRs") generated at the MSC 218 for each call in the network 200. In such an embodiment, the BTS 214 or the BSC 216 may trigger the MSC 218 to create a CDR for any given call upon detecting a call originating at one of the mobile terminals 202, 204 or 206, or upon detecting a call terminating at one of the mobile terminals. A CDR may identify one or more mobile terminals engaged in a call for which the CDR was created, as well as the time when the mobile terminals were engaged in the call.

Further, the CDRs stored in the network operation database 220 include network operation events detected for each call session in the records. According to an exemplary embodiment, the network operation events that are recorded in the CDRs may include, among others, a call drop event and a call block event.

During a normal call flow, the BTS 214 assigns one of the available radio channels to a mobile terminal involved in a call session. When the call session is terminated, the mobile terminal or the BTS 214 sends a call termination message indicating the end of the call, and the radio channel assigned to the mobile terminal is released. However, if a call termination message is not sent from or received at the BTS 214, and the radio channel becomes inactive (i.e., no data are transmitted to or from the mobile terminal across the radio channel), the BTS 214 detects a dropped call event and reports the dropped call event to the MSC 218 that subsequently updates the respective CDR created for the call. Thus, the CDR may identify the mobile terminals that were engaged in the dropped call, the time when the call was dropped, and other data relevant to the call.

Similarly, when a new call request, such as a call request originating from or terminating at one of the mobile terminals in FIG. 2, arrives at the BTS 214, the BTS 214 may determine if sufficient air link resources and network resources exist to connect the call. For example, to determine if sufficient air link resources exist, the BTS 214 may determine if there is an available free radio channel, and/or if the available radio channel has sufficient power to connect a call session. Further, to determine if sufficient network resources exist, the BTS 214 may determine if there are any available channels, such as T1 channels, or if there is a sufficient switch capacity to handle the new call. It should be understood that the BTS 214 may also check different resources, and the exemplary embodiments are not limited to the examples provided above. If the BTS 214 determines that the air link or network resources are insufficient to connect a call, the BTS 214 may block the incoming call. If the BTS 214 blocks the call, the BTS 214 reports the blocked call event to the MSC 218, and the MSC 218, responsively, generates a CDR for the mobile terminals involved in the blocked call session. The CDR generated at the MSC 218 may identify the time of the blocked call and the mobile terminals involved in the dropped call. In one embodiment, the CDR may include MINs of the mobile terminals. However, different types of identifiers could also be used to identify mobile terminals in CDRs.

The MPC 224 includes a location history database 226 including a location history log reflecting where mobile terminals are located over time. The location history log is established by regularly determining the locations of mobile stations operating in the network 200. According to an exemplary embodiment, the location of the mobile terminals may be determined using one or more position determining technologies. For example, some mobile terminals may be equipped with a global positioning system ("GPS") transceiver using, for example, a triangularization method for determining precise locations, the arrangement of which is well known to those skilled in the art and therefore not described here. Such mobile terminals may be arranged to regularly determine and provide their locations (such as longitude/latitude coordinates, rather than cell/sector information) to the PDE 230 or to the MPC 224, and the locations may be recorded in the location history database 226.

Alternatively, the location of the mobile terminals may be determined using a network-based technology. In such an embodiment, upon detecting a call originating from or terminating at one of the mobile terminals in the network 200, the MSC 218 may request the MPC 224 to start regularly determining the position of the mobile terminals engaged in the call. In such an embodiment, the MPC 224 may relay the location request to the PDE 230 that, responsively, may regularly report the mobile terminal's positions to the MPC 224. According to one embodiment, the PDE 230 may be configured with a predetermined timestamp period that controls how often the PDE 230 determines and reports to the MPC 224 locations of the mobile terminals. Alternatively, instead of configuring the PDE 230 with a timestamp period, the MSC 218 or the MPC 224 may be arranged to specify in a request message how often the PDE 230 should determine and report the locations of one or more mobile terminals engaged in a call session.

When the MPC 224 receives the location information from the PDE 230, the MPC 224 may store the location information in the location history database 226. Further, in such an embodiment, upon detecting the end of the call session, MSC 218 may request that the MPC 224 terminates the process of regularly determining locations of the mobile terminals engaged in the call.

Further, alternatively, the PDE 230 may be arranged to autonomously determine locations of mobile terminals upon detecting a call being originated from or being terminated at the mobile terminals in the network 200. In such an embodiment, the PDE 230 may start regularly determining and reporting to the MSC 218 a location of a mobile terminal until the call is released.

According to an exemplary embodiment, the network monitoring entity 236 is arranged to correlate predetermined network events with mobile terminal location data to determine locations where particular network events have occurred. The network monitoring entity 236 may do that by combining the location history log stored in the location history database 226 with the network operation log stored in the network operation database 220. According to an exemplary embodiment, the network monitoring entity 236 may periodically query the MSC 218 to provide network operation records including predetermined network events. Alternatively, the MSC 218 may be arranged to periodically provide the network operation log to the network monitoring entity that may compile the received records and filter out the ones not including the predetermined network events, such as records that do not indentify dropped call events or blocked call events, for instance.

Similarly, the network monitoring entity 236 may periodically query the MPC 224 to provide the location history log, or the MPC 224 may be arranged to periodically send the records to the network monitoring entity 236. Based on the selected network operation records, the network monitoring entity 236 may then identify the mobile terminals that were engaged in a call and pull location history records of the identified mobile terminals. By reference to the selected network operation records and the location history records, the network monitoring entity 236 may identify the mobile terminals that were engaged in a call with a predetermined network event, a time when the network event occurred, and the locations of mobile terminals at that time.

According to an exemplary embodiment, the network monitoring entity 236 may generate a network operation report based on the combined records. For example, the network monitoring entity 236 may determine the number of mobile terminals engaged in calls in a given location at various times of the day, the number of dropped or blocked calls that occurred at various locations, and the times of the dropped or blocked calls at various locations. The network monitoring entity 236 may then store the generated information in the network operation report. The network monitoring entity 236 may be arranged to generate one or more network operation reports a day, and store the reports in the network performance database 238, for instance.

Provided with the information from network operation reports generated at the network monitoring entity 236, the wireless carrier may decide that a need exists to expand air interface resources during the peak use times at predetermined locations. Additionally, for instance, using the report, the wireless carrier can determine that many dropped calls tend to occur at a given location, while very few calls tend to occur at another location. With the benefit of this information, the wireless carrier may then seek to improve network resources to better serve the location where many dropped or blocked calls are occurring.

FIG. 3 is a functional block diagram 300 illustrating one exemplary arrangement of the network monitoring entity 236. As illustrated, the network monitoring entity 236 may include a first interface 302, a second interface 304, a processor 306, and data storage 308, all of which may be coupled together via a system bus 310.

The data storage 308 may function to hold a set of machine language instructions defining program logic executable by the processor 306 to carry out various functions described herein. Alternatively, the network monitoring entity 236 can embody various combinations of hardware, firmware or software to carry out the functions described herein. For example, the program logic may cause the network monitoring entity 236 to request location history records from a location system or network operation records from a switching system such as an MSC, for instance. Further, the program logic may cause the processor to generate network operation reports based on the location history records and the network operation records. Further, the data storage 308 may function to hold the network operation data, the location history data and the network operation reports.

The first interface 302 may function to enable communications between the network monitoring entity 236 and the location system, such as the MPC 224. Alternatively, mobile terminals having location determining capabilities may provide their locations directly to the network monitoring entity 236 via the first interface 302. The second interface 304 may function to enable communications between the network monitoring entity 236 and the switching system, such as the MSC 224.

FIG. 4 is a flow chart illustrating a process for monitoring wireless network events on a network monitoring entity in accordance with one exemplary embodiment. It should be understood that variations on the functions and order shown in the flow chart are possible.

At step 402, the network monitoring network entity, such as the entity 236 illustrated in FIG. 2, receives a plurality of location history records including location information for a plurality of mobile terminals. According to an exemplary embodiment, each location record includes a mobile terminal identifier, such as MIN, to identify the mobile terminal in the record. For example, the network monitoring entity may receive the location history records from a location system in a network, or, alternatively, mobile terminals may report their locations directly to the network monitoring entity.

At step 404, the network monitoring entity receives a plurality of network operation records from a switching system in the network. According to an exemplary embodiment, the network monitoring entity may receive CDRs from one or more MSCs in the network, and each CDR includes MINs of the mobile terminals involved in a call as well as network operation parameters associated with the call.

At step 406, the network monitoring entity selects network operation records including a predetermined network event. According to an exemplary embodiment, the predetermined network event may be a dropped call event, a blocked call event, or a different network event.

At step 408, the network monitoring entity determines mobile terminal identifiers from the selected network operation records including the predetermined network event. Next, at step 410, the network monitoring entity selects location history records including the mobile terminal identifiers determined from the selected network operation records. At step 412, the network monitoring entity combines the selected network operation records and location history records to determine locations of the predetermined network event. For instance, the network monitoring entity may first determine the times when the predetermined network event occurred, and then, based on the location history records of the mobile terminals involved in the calls having the predetermined network events, the network monitoring entity may determine the locations of those events. Additionally, the network monitoring entity may generate a call event report including locations where the predetermined network events occurred, times of the network events' occurrences, and mobile terminal identifiers involved in the predetermined network events, for example.

It will be apparent to those of ordinary skill in the art that the described methods may be embodied in one or more computer program products that include one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Exemplary embodiments of the present invention have been described above. Those skilled in the art will understand, however, that changes and modifications may be made to these embodiments without departing from the true scope and spirit of the present invention, which is defined by the claims.

What is claimed is:

1. A method for monitoring network events in a wireless network, the method comprising:
    establishing a plurality of location history records keyed to a plurality of mobile terminals operating in a wireless network;
    establishing at a mobile switching entity a plurality of call detail records keyed to the plurality of mobile terminals, wherein the plurality of call detail records include two or more call detail records that each indicate an occurrence of a given call event in the wireless network, and wherein the plurality of call detail records include at least one call detail record that does not indicate the occurrence of the given call event in the wireless network the given call event being selected from the group consisting of (i) a dropped call event and (ii) a blocked call event;

selecting from the plurality of call detail records the two or more call detail records that each indicate the occurrence of the given call event in the wireless network;

based on the selected call detail records, identifying respective mobile terminals that experienced the given call event;

selecting from the plurality of location history records corresponding location history records keyed to the respective mobile terminals; and combining the selected call detail records and the selected location history records to determine locations of the given call event in the wireless network.

2. The method of claim 1, wherein each of the selected call detail records comprises an indication of respective time when the given call event occurred in the wireless network, and wherein each of the selected location history records comprises an indication of respective time when location was recorded, and wherein the method further comprises:

for each respective mobile terminal, determining respective time when the mobile terminal experienced the given call event; and for each respective mobile terminal, determining where the mobile terminal was located when the mobile terminal experienced the given call event.

3. The method of claim 1, wherein identifying the respective mobile terminals that experienced the given call event comprises reading respective mobile terminal identifiers from the selected call detail records.

4. The method of claim 2, wherein determining each respective time when the mobile terminal experienced the given call event comprises reading the respective time from a respective one of the selected call detail records.

5. The method of claim 2, wherein determining where each respective mobile terminal was located when the mobile terminal experienced the given call event comprises, for each respective mobile terminal, reading from the selected location history records where the mobile terminal was located at the respective time.

6. The method of claim 2, further comprising establishing a network operation report comprising locations of the given call event in the wireless network.

7. The method of claim 1, wherein establishing the plurality of location history records comprises:

applying position determining equipment to regularly determine location of each of the plurality of mobile terminals operating in the wireless network; and recording the location in the plurality of location history records.

8. A method for monitoring call events in a wireless network, the method comprising:

receiving a plurality of location history records keyed to a plurality of the terminals operating in the wireless network;

receiving from a mobile switching entity a plurality of call detail records keyed to the plurality of mobile terminals, wherein the plurality of call detail records include two or more call detail records that each indicate an occurrence of a given call event in the wireless network, and wherein the plurality of call detail records include at least one call detail record that does not indicate the occurrence of the given call event in the wireless network, the given call event being selected from the group consisting of (i) a dropped call event and (ii) a blocked call event;

selecting from the plurality of call detail records the two or more call detail records that each indicate the occurrence of the given call event in the wireless network;

for each selected call detail record indicating the occurrence of the given call event in the wireless network, identifying a respective mobile terminal that experienced the given call event, and determining from a location history record of the respective mobile terminal where the respective mobile terminal was located when the mobile terminal experienced the given call event; and based on location of each respective mobile terminal when the given call event occurred, establishing a call event report comprising locations of the given call event in the wireless network.

9. The method of claim 8, wherein each of the selected call detail records comprises time when the given call event occurred in the wireless network, and wherein determining when each respective mobile terminal experienced the given call event comprises:

for each respective mobile terminal, reading respective time from the selected call detail record; and for each respective mobile terminal, using the respective time to read from the location history record of the respective mobile terminal where the mobile terminal was located when the mobile terminal experienced the given call event.

10. A network monitoring entity in a wireless network, the network monitoring entity receiving from a mobile switching center a plurality of call detail records keyed to a plurality of mobile terminals operating in the wireless network, wherein the plurality of call detail records include two or more call detail records that each indicate an occurrence of a given call event in the wireless network, wherein the plurality of call detail records include at least one call detail record that does not indicate the occurrence of the given call event in the wireless network, the given call event being selected from the group consisting of (i) a dropped call event and (ii) a blocked call event, the network monitoring entity further receiving a plurality of mobile terminal location history records from a location determining system, the network monitoring entity responsively (i) selecting from the plurality of call detail records the two or more call detail records that each indicate the occurrence of the given call event in the wireless network, (ii) based on the selected call detail records, identifying respective mobile terminals that experienced the given call event, (iii) selecting from the plurality of mobile terminal location history records corresponding location history records keyed to the respective mobile terminals, and (iv) combining the selected call detail records and the selected mobile terminal location history records to determine locations of the given call event in the wireless network.

11. A system for monitoring network events in a wireless network, the system comprising:

means for establishing a plurality of location history records keyed to a plurality of mobile terminals operating in the wireless network;

means for establishing at a mobile switching center a plurality of call detail records keyed to the plurality of mobile terminals, wherein the plurality of call detail records include two or more call detail records that each indicate an occurrence of a given call event in the wireless network, and wherein the plurality of call detail records include at least one call detail record that does not indicate the occurrence of the given call event in the wireless network the given call event being selected from the group consisting of (i) a dropped call event and (ii) a blocked call event;

means for selecting from the plurality of call detail records the two or more call detail records that each indicate the occurrence of the given call event in the wireless network;

means for, based on the selected call detail records, identifying respective mobile terminals that experienced the given call event;

means for selecting from the plurality of location history records corresponding location history records keyed to the respective mobile terminals; and means for combining the selected call detail records and the selected location history records to determine locations of the given call event in the wireless network.

* * * * *